United States Patent [19]
Davis et al.

[11] Patent Number: 5,802,949
[45] Date of Patent: Sep. 8, 1998

[54] CLOSED CENTER POWER STEERING GEAR

[75] Inventors: Alan Crary Davis; Dennis Charles Eckhardt, both of Saginaw; Randy Scott Miller, Frankenmuth, all of Mich.

[73] Assignee: General Motors Corporation, Detroit, Mich.

[21] Appl. No.: 689,621

[22] Filed: Aug. 12, 1996

[51] Int. Cl.$^6$ .................................................. F15B 9/10
[52] U.S. Cl. ........................................ 91/375 R; 91/382
[58] Field of Search ............................. 91/374, 375 R, 91/382

[56] References Cited

U.S. PATENT DOCUMENTS

| | | | |
|---|---|---|---|
| 2,369,324 | 2/1945 | Thompson | 91/375 R |
| 2,685,342 | 8/1954 | Lauck | 91/375 R |
| 4,003,404 | 1/1977 | Burckhardt | 137/627.5 |
| 4,096,883 | 6/1978 | Yip | 137/596.13 |
| 4,332,303 | 6/1982 | de Maight | 180/132 |
| 4,469,342 | 9/1984 | Millard | 280/148 |
| 4,558,720 | 12/1985 | Larson et al. | 137/625.24 |
| 5,209,317 | 5/1993 | Schnelle | 180/132 |
| 5,224,564 | 7/1993 | Duffy | 180/132 |
| 5,372,214 | 12/1994 | Haga et al. | 180/132 |

FOREIGN PATENT DOCUMENTS

| | | | |
|---|---|---|---|
| 1108056 | 1/1956 | France | 91/382 |
| 1197908 | 7/1970 | United Kingdom . | |
| WO 94/06667 | 3/1994 | WIPO . | |

*Primary Examiner*—F. Daniel Lopez
*Attorney, Agent, or Firm*—Saul Schwartz

[57] ABSTRACT

A closed center power steering gear having a spool shaft connected to a steering wheel of the motor vehicle, a pinion head connected to steered wheels of the motor vehicle, and a control valve between a fluid accumulator and a working chamber of a steering assist fluid motor. The control valve includes a poppet on the spool shaft having closed and open positions blocking and permitting, respectively, flow from the accumulator to the fluid motor working chamber, a cam on the pinion head, a cam follower on the spool shaft, and a pressure control spring between the cam follower and the poppet. The cam, the cam follower, and the pressure control spring cooperate during relative rotation between the spool shaft and the pinion head to shift the poppet to its open position. Boost pressure in the fluid motor working chamber increases and reacts against the poppet to compress the pressure control spring and shift the poppet to its closed position. The contour of the cam is calculated to cause steering assist boost pressure in the working chamber to increase at a rate faster than applied torque increases thereby to achieve a nonlinear relationship between boost pressure and applied torque.

5 Claims, 4 Drawing Sheets

CLOSED CENTER POWER STEERING GEAR

FIELD OF THE INVENTION

This invention relates to hydraulic power steering gears for motor vehicles.

BACKGROUND OF THE INVENTION

For steering assist, motor vehicles typically include a pump, a reservoir, a steering assist fluid motor, and a power steering gear having a control valve which produces in a working chamber of the fluid motor a steering assist boost pressure in response to a manual steering input, i.e., "applied torque", on a steering wheel of the motor vehicle. Power steering gears are commonly identified as "open center" when the pump operates continuously and the control valve produces steering assist boost pressure by throttling the continuous flow of fluid from the pump. A representative open center power steering gear is described in U.S. Pat. No. 4,454,801, issued Jun. 19, 1984 and assigned to the assignee of this invention. Power steering gears are commonly referred to as "closed center" when the pump operates intermittently to charge an accumulator, and the control valve produces steering assist boost pressure by releasing fluid from the accumulator to the fluid motor working chamber until the boost pressure in the latter achieves a magnitude determined by a pressure control spring. A closed center power steering gear is described in U.S. Pat. No. 4,325,286. Open center power steering gears are characterized by a nonlinear relationship between boost pressure and applied torque, i.e., boost pressure increases at a rate faster than the rate at which applied torque increases. Known closed center power steering gears, however, have achieved only a linear relationship between boost pressure and applied torque or have achieved a simulated nonlinear relationship by piecing together a plurality of different linear relationships.

SUMMARY OF THE INVENTION

This invention is a new and improved closed center power steering gear for a motor vehicle having a spool shaft connected to a steering wheel of the motor vehicle, a pinion head connected to steered wheels of the motor vehicle, and a control valve between a fluid accumulator and a working chamber of a steering assist fluid motor. The control valve includes a poppet on the spool shaft having closed and open positions blocking and permitting, respectively, flow from the accumulator to the fluid motor working chamber, a cam on the pinion head, a cam follower on the spool shaft, and a pressure control spring between the cam follower and the poppet. The cam, the cam follower, and the pressure control spring cooperate during relative rotation between the spool shaft and the pinion head to shift the poppet to its open position. Boost pressure which then develops in the fluid motor working chamber as the accumulator discharges into the latter increases and reacts against the poppet to compress the pressure control spring and shift the poppet to its closed position. The contour of the cam is calculated to cause steering assist boost pressure in the working chamber to increase at a rate faster than applied torque increases thereby to achieve a nonlinear relationship between boost pressure and applied torque.

DESCRIPTION OF A PREFERRED EMBODIMENT

Figure 1:
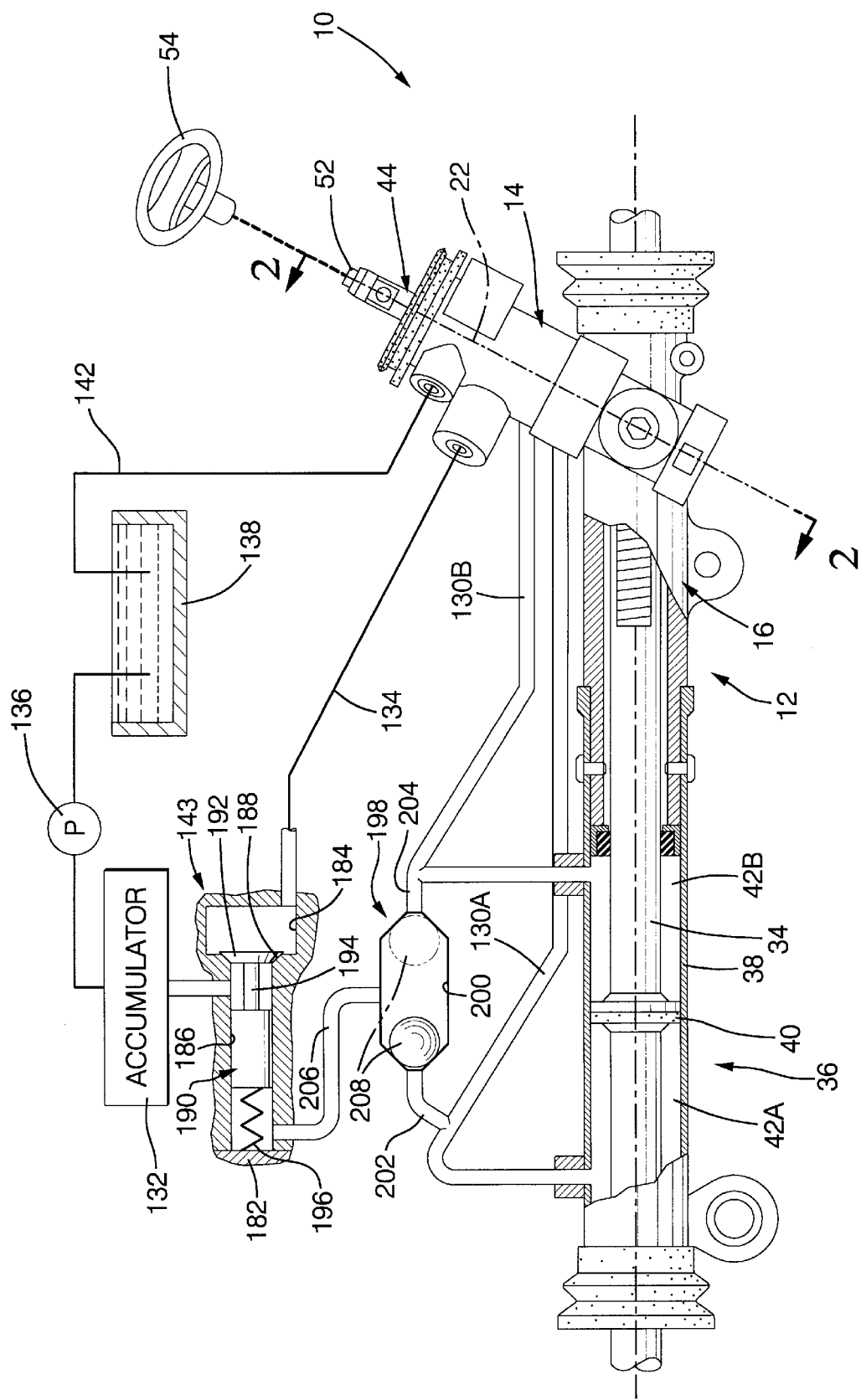
FIG. 1 is a partially broken-away view of a closed center power steering gear according to this invention.
Figure 2:
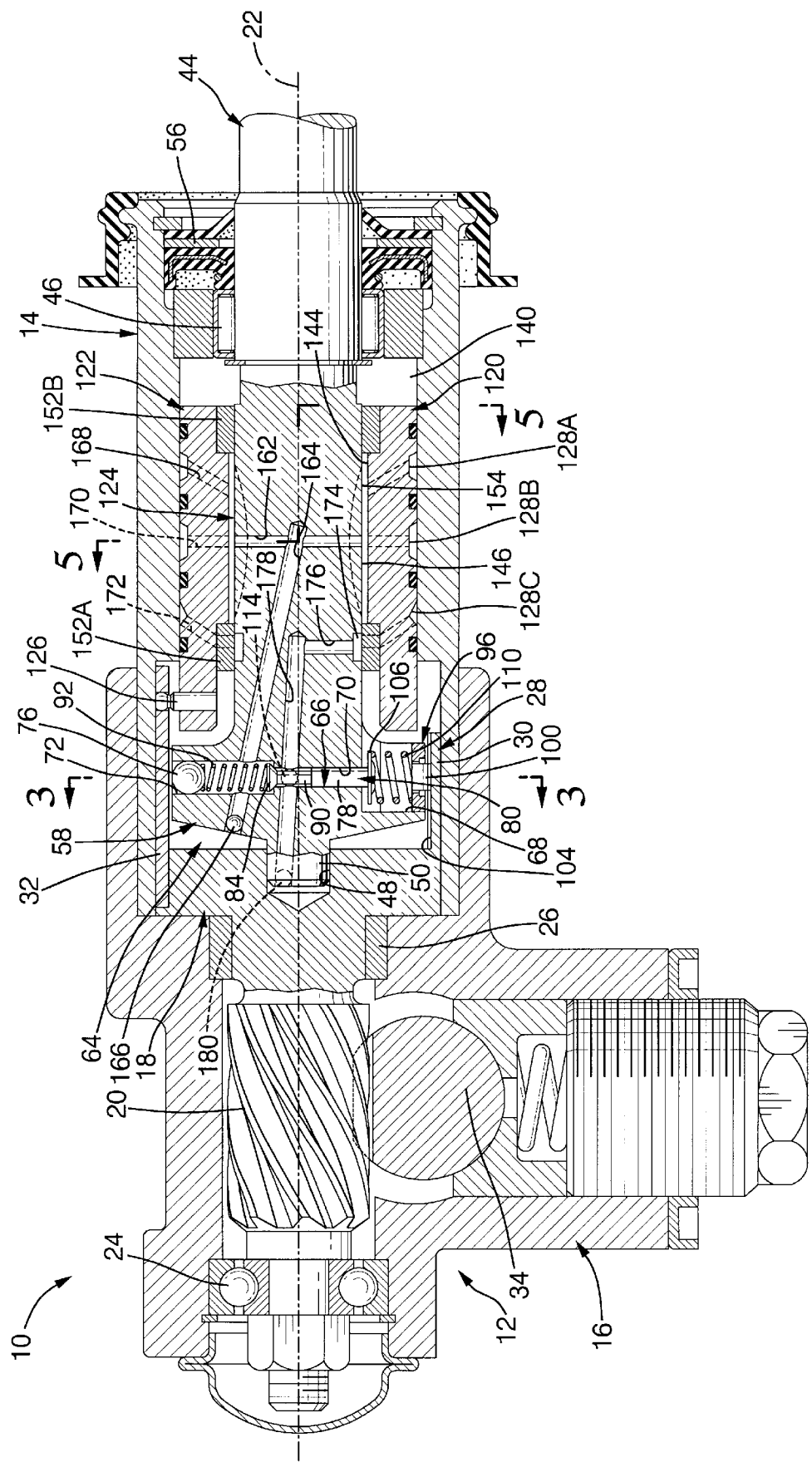
FIG. 2 is an enlarged sectional view taken generally along the plane indicated by lines 2—2 in FIG. 1.

Referring to FIGS. 1–2, a closed center power steering gear 10 according to this invention for a motor vehicle, not shown, includes a housing 12 having a tubular valve housing portion 14 rigidly connected to a tubular rack housing portion 16. A pinion head 18 including an integral pinion gear 20 is supported on the housing 12 for rotation about a longitudinal centerline 22 of the steering gear by a ball bearing 24 and by a sleeve bearing 26. The pinion head 18 further includes a tubular end 28 consisting of an integral wall 30 and an insert 32, FIGS. 2–3, rigidly attached to the pinion head in a gap in the integral wall.

A rack bar 34 is supported in the rack housing portion 16 for back and forth linear translation. The pinion gear 20 meshes with rack gear teeth on the rack bar 34 so that rotation of the pinion head and linear translation of the rack bar occur concurrently. Opposite ends of the rack bar 34, not shown, are linked to dirigible "steered" wheels of the motor vehicle in the usual way for steering the vehicle by back and forth translation of the rack bar.

A steering assist fluid motor 36 includes a cylinder 38 rigidly attached to the rack housing portion 16 around the rack bar 34 and an annular piston 40 on the rack bar which seals against the inside of the cylinder 38. Fluid seals at opposite ends of the cylinder 38 cooperate with the piston 40 in defining a pair of variable volume working chambers 42A, 42B of the fluid motor.

As seen best in FIG. 2, a spool shaft 44 of the steering gear 10 is supported on the valve housing portion 14 for rotation about the centerline 22 by a roller bearing 46 and by a bearing defined by a cylindrical bore 48 in the pinion head around a cylindrical end 50 of the spool shaft. An outboard end 52 of the spool shaft is connected to a schematically represented steering wheel 54 of the motor vehicle for unitary rotation therewith. A fluid seal 56 closes the open end of the valve housing portion 14 around the spool shaft.

Figure 3:
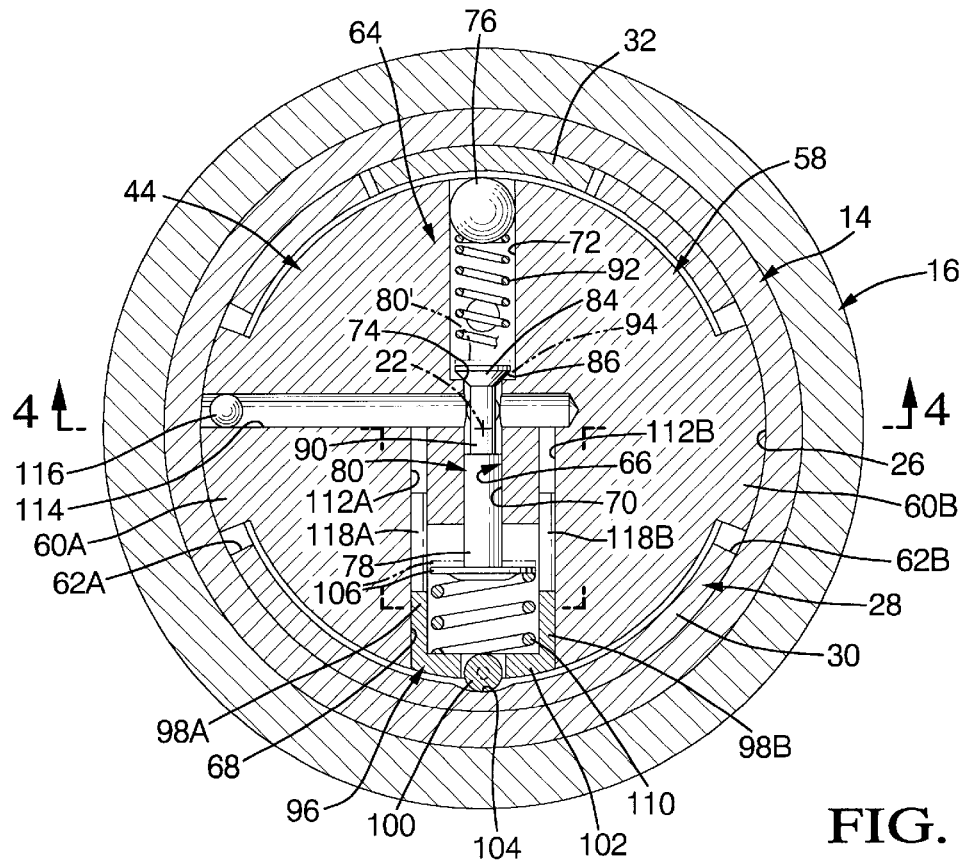
FIG. 3 is a sectional view taken generally along the plane indicated by lines 3—3 in FIG. 2.
Figure 4:
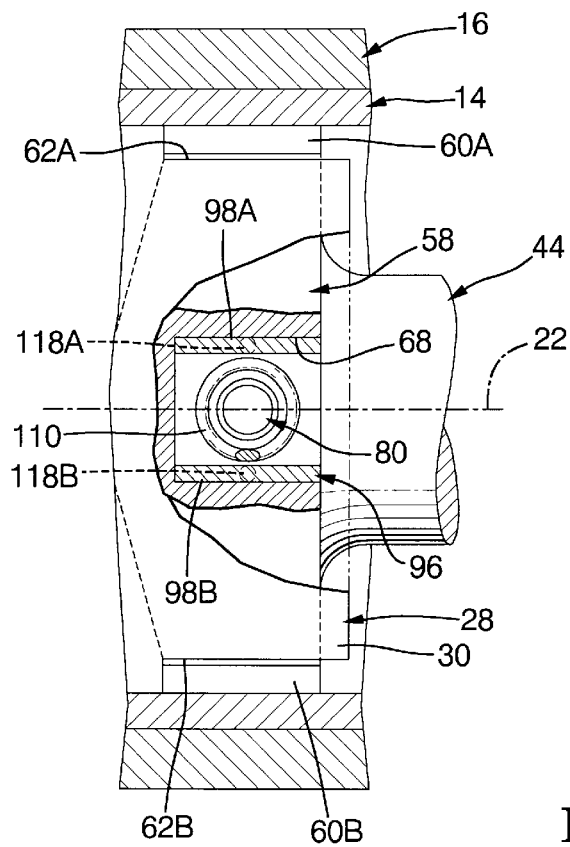
FIG. 4 is a sectional view taken generally along the plane indicated by lines 4—4 in FIG. 3.

An enlarged, disc-shaped end 58 of the spool shaft 44 is disposed inside of the tubular end 28 of the pinion head with a pair of radial lugs 60A, 60B on the disc-shaped end, FIG. 3, centered in a corresponding pair of slots 62A, 62B in the tubular end. The spool shaft and the pinion head are rotatable about the centerline 22 relative to each other through a total angular range of about 14°. At opposite ends of such angular range, the lugs 60A, 60B engage the sides of the slots 62A, 62B to effect a positive driving connection between the pinion head and the spool shaft.

A control valve 64 of the steering gear 10 on the spool shaft 44 includes a stepped bore 66 in the disc-shaped end 58 perpendicular to the centerline 22 and a rectangular notch 68 in the disc-shaped end. The stepped bore 66 has a small diameter end 70, a big diameter end 72, and an annular shoulder 74, FIG. 3, between the small and big diameter ends. The small diameter end 70 opens into the notch 68 and the big diameter end 72 is closed by an interference fitted steel ball 76. The notch 68 opens toward the tubular end 28 of the pinion head 18.

A cylindrical base 78 of a tubular poppet 80 of the control valve 64 is supported in the small diameter end 70 of the stepped bore 66 for linear translation perpendicular to the centerline 22. The poppet 80 has an internal passage 82, FIG. 6, a head 84 in the big diameter end 72 of the stepped bore, a first frustoconical shoulder 86 on the head, a second frustoconical shoulder 88 on the base 78, and a reduced diameter stem 90 between the head and the base. A relatively weak secondary spring 92 biases the poppet 80 to a closed position, FIGS. 2–3, in which a seat defined by the first frustoconical shoulder 86 bears against a seat defined by the circular edge of the annular shoulder 74 of the stepped bore.

The poppet has a range of open positions in which, commencing at the closed portion of the poppet, the span between the first frustoconical shoulder 86 and the annular shoulder 74 is progressively greater and in which the shoulders 86, 74 cooperate in defining a corresponding range of annular flow orifices having progressively increasing size. A representative open position 80' of the poppet 80 is illustrated in broken lines in FIG. 3 along with a corresponding representative annular flow orifice 94 between the first frustoconical shoulder 86 and the annular shoulder 74.

A U-shaped cam follower 96 of the control valve 64 in the notch 68 has a pair of sides 98A, 98B which cooperate with closely adjacent sides of the notch 68 in guiding the cam follower for linear translation perpendicular to the centerline 22 of the steering gear. A roller 100 is rotatably supported on a web 102 of the cam follower between the sides 98A, 98B and cooperates with a cam 104 on the integral wall 30 of the tubular end 28 of the pinion head 18 in inducing linear translation of the cam follower perpendicular to the centerline 22 in response to rotation of the spool shaft 44 relative to the pinion head 18.

Figure 6:
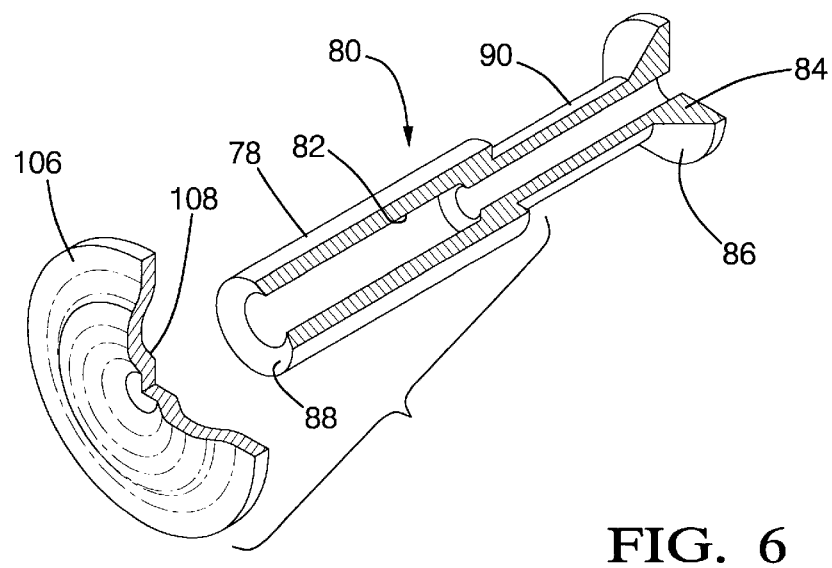
FIG. 6 is a partially broken-away, perspective view of a portion of the control valve of the closed center power steering gear according to this invention.

As seen best in FIGS. 3 and 6, a disc-shaped plate 106 in the notch 68 has a third frustoconical shoulder 108 facing the second frustoconical shoulder 88 on the poppet 80. A pressure control spring 110 in the notch 68 seats at one end against the web 102 of the cam follower and at the other end against the plate 106. The uncompressed or free length of the pressure control spring 110 is calculated to achieve juxtaposition of the second and third frustoconical shoulders 88, 108 when the roller 100 is in the middle of the cam 104 and the poppet 80 is in its closed position.

As seen best in FIGS. 2–3, a pair of cylindrical bores 112A, 112B in the disc-shaped end 58 of the spool shaft intersect both the notch 68 and a passage 114 in the disc-shaped end which is sealed closed by an interference fitted steel ball 116. A pair of rod-shaped pistons 118A, 118B are disposed in respective ones of the cylindrical bores 112A, 112B for linear translation parallel to both the cam follower 96 and the poppet 80 and bear against the outboard edges of corresponding ones of the sides 98A, 98B of the cam follower 96.

Figure 5:
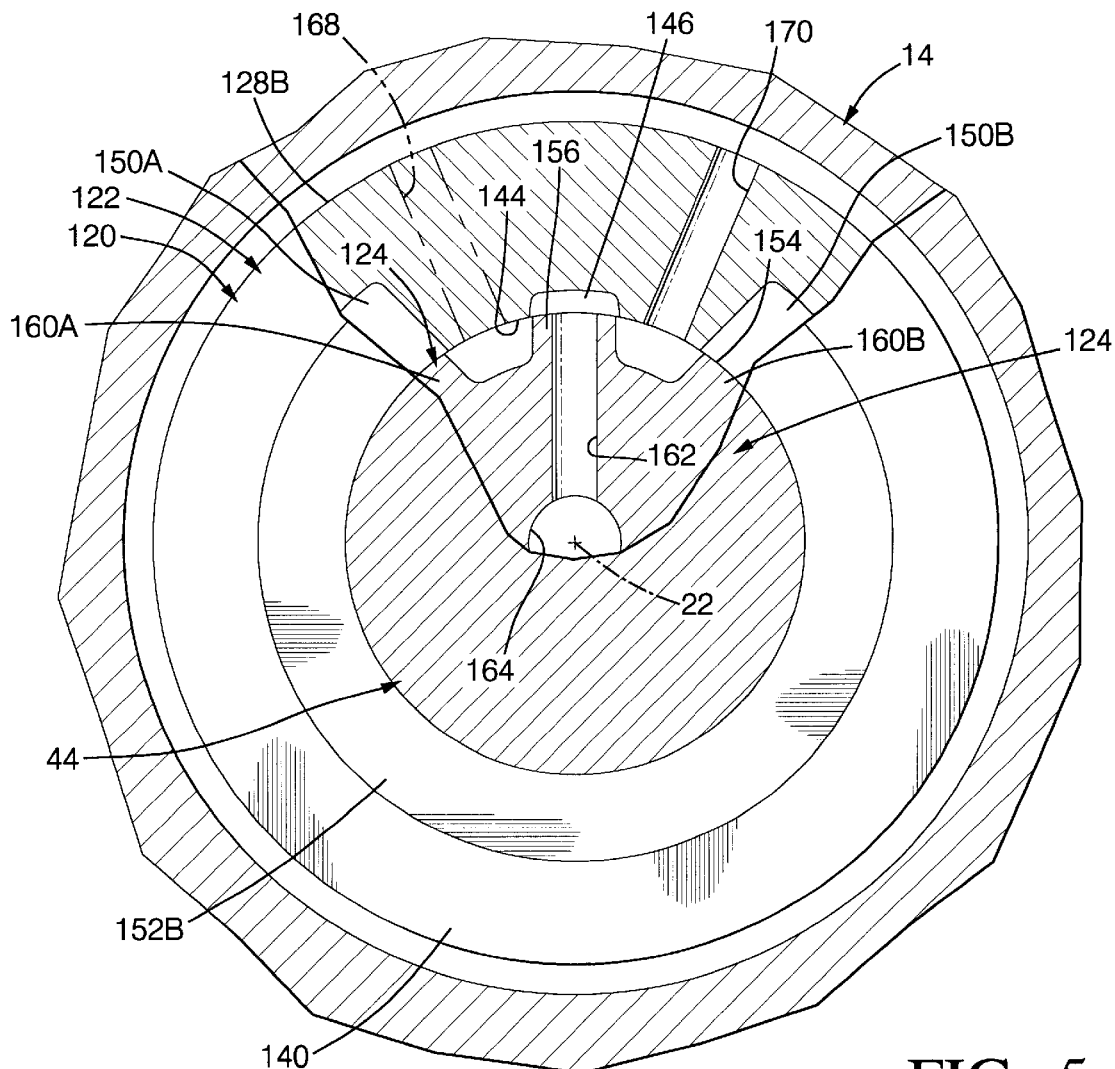
FIG. 5 is a sectional view taken generally along the plane indicated by lines 5—5 in FIG. 2.

As seen best in FIGS. 1, 2 and 5, a direction valve 120 of the steering gear 10 includes a tubular valve body 122 in the valve housing portion 14 and a valve spool 124 consisting of the part of the spool shaft 44 encircled by the valve body. A radial pin 126 rigidly attached to the valve body 122 is closely received in a socket in the insert 32 of the tubular end 28 of the pinion head whereby the valve body and the pinion head rotate as a unit about the centerline 22.

The valve body 122 has a plurality of annular outside grooves 128A, 128B, 128C isolated from each other by seal rings on the valve body bearing against the valve housing portion 14. The grooves 128A, 128B are connected to the working chambers 42A, 42B of the fluid motor 36 through a pair of external conduits 130A, 130B, respectively. The groove 128C is connected to a fluid accumulator 132 through a high pressure conduit 134. A pump 136 draws fluid from a reservoir 138 and operates intermittently to maintain fluid in the accumulator at a high "accumulator pressure." A low pressure environment 140 inside the valve housing portion 14 at essentially atmospheric pressure communicates with the reservoir 138 through a return conduit 142. A schematically represented pressure reducing valve 143, described in further detail below, is disposed in the high pressure conduit 134 between the accumulator 132 and the annular groove 128C on the valve body.

Referring to FIG. 5, a cylindrical inner wall 144 of the valve body has a pressure slot 146 therein and a pair of deeper return slots 150A, 150B on opposite sides of the pressure slot, all parallel to the centerline 22. The pressure slot 146 is closed at opposite ends by a pair of rings 152A, 152B, FIG. 2, on the valve body which seal against the spool shaft 44. The return slots 150A, 150B communicate around the rings 152A, 152B with the low pressure environment 140.

A cylindrical outer wall 154 of the valve spool 124 closely facing the cylindrical inner wall 144 of the valve body is interrupted by a plurality of closed-ended grooves which cooperate in defining a pressure land 156 and a pair of return lands 160A, 160B on opposite sides of the pressure land. In a center position of the spool shaft 44 relative to the pinion head 18, FIG. 5, referred to below as the "relative center position of the spool shaft," the pressure slot 146 and pressure land 156 are "zero lapped," i.e., the edges of the pressure land and pressure slot substantially coincide without significant overlap, and the return slots 150A, 150B and return lands 160A, 160B are "under lapped," i.e., clearance exists between the edges of the return lands and the corresponding edges of the return slots.

A radial passage 162 in the spool shaft 44 intersects at one end the cylindrical outer wall 154 of the valve spool 124 in the middle of the pressure land 156 and at the other end an oblique longitudinal passage 164 in the spool shaft. The oblique passage 164 intersects the big diameter end 72 of the stepped bore 66 and is sealed closed by an interference fitted steel ball 166, FIG. 2.

The working chamber 42A of the fluid motor communicates with a flow path in the direction valve between the pressure slot 146 and the return slot 150A through the conduit 130A, the annular groove 128A on the valve body, and a radial cylinder port 168 in the valve body. Similarly, the working chamber 42B of the fluid motor communicates with a flow path in the direction valve between the pressure slot 146 and the return slot 150B through the conduit 130B, the annular groove 128B on the valve body, and a radial cylinder port 170 in the valve body.

A schematically represented passage 172 extends through the valve body 122 and the ring 152A from the annular groove 128C on the valve body to an annular groove 174 in the valve spool 124. A radial passage 176 in the spool shaft intersects both the annular groove 174 and a second oblique longitudinal passage 178 in the spool shaft which is sealed closed by an interference fitted steel ball 180, FIG. 2. The second oblique passage 178 intersects the small diameter end 70 of the stepped bore 66 for communication with both the annulus around the stem 90 of the poppet and the passage 114 which communicates with the cylindrical bores 112A, 112B.

As seen best in FIG. 1, the pressure reducing valve 143 includes a housing 182 having an end chamber 184, a bore 186, and a frustoconical seat 188 between the bore and the end chamber. A spool 190 of the pressure-reducing valve has a valve head 192 and shank 194. The spool is disposed in the bore 186 for linear translation between a closed position, FIG. 1, in which the valve head 192 seals against the seat 188, and an open position, not shown, in which the valve head is remote from the seat. A spring 196 in the bore 186 biases the spool toward its open position.

An upstream end of the high pressure conduit 134 originating at the accumulator 132 communicates with the bore 186 around the shank 194 of the spool 190. A downstream end of the high pressure conduit 134 terminating at the annular groove 128C on the valve body 122 communicates with the end chamber 184 on the opposite side of the seat 188 from the upstream end of the high pressure conduit.

A switching valve 198 has a ball chamber 200 which communicates at one end with the external conduit 130A through a branch 202 and at the other end with the external conduit 130B through a branch 204. Intermediate the branches 202, 204, the ball chamber 200 communicates with the bore 186 behind the spool 190 through a branch 206. A ball 208 in the ball chamber 200' is shiftable back and forth between a first position in which the branches 202, 206 are in flow communication and the branch 204 is covered by the ball 208 and an opposite second position in which the branches 204, 206 are in flow communication and the branch 202 is covered by the ball 208.

The operation of the steering gear 10 is now described. In the relative center position of the valve spool, the external conduits 130A, 103B are connected to the low pressure environment 140 and the spring 196 biases the spool 190 in the pressure-reducing valve 143 to its open position. When the pump 136 is turned on, fluid circulates through the pressure-reducing valve 143 into a closed flow path including the annulus around the stem 90 of the poppet 80 and the cylindrical bores 112A, 112B.

With zero applied torque on the steering wheel 54, fluid pressure on the rodshaped pistons 118A, 118B establishes the relative center position of the spool shaft by thrusting the pistons and the cam follower 96 radially outward to seat the roller 100 in the center of the cam 104. At the same time, the poppet 80 is in hydrostatic equilibrium with respect to fluid pressure around the stem 90 of the poppet and the latter is held in its closed position by the secondary spring 92. Each of the working chambers 42A, 42B and the bore 186 of the pressure-reducing valve behind the spool 190 communicates with the low pressure environment 140 through the return slots 150A, 150B in the valve body of the direction valve 120.

When the fluid pressure in the aforesaid closed flow path achieves a magnitude of, for example, about 100 psi, a net pressure force develops on the valve head 192 which effects linear translation of the latter to its closed position. The spool 190, in its closed position, is in hydrostatic equilibrium with respect to fluid pressure around the shank 194 so that even though the pump 136 continues to charge the accumulator to the aforesaid high accumulator pressure, such high pressure is blocked from entering the steering gear 10 by the valve head 192.

If then, for example, clockwise, FIGS. 3 and 5, manual effort is applied to the steering wheel 54 under conditions of low steering resistance at the steered wheels, e.g., highway speed driving, the steered wheels yield to the force applied to the rack bar 34 by the pinion gear 20, and the pinion gear and the pinion head 18 commence to rotate, before the force reaction between the roller 100 and the cam 104 attributable to the applied torque achieves a magnitude exceeding the opposite thrust applied to the cam follower by the rod-shaped pistons 118A, 118B. Accordingly, in the described circumstance, the pinion head 18 and spool shaft 44 rotate clockwise as a unit and the vehicle is steered manually without power assist.

With applied torque in the same direction, but under conditions of higher steering resistance at the steered wheels, e.g., low speed driving, the steered wheels do not yield to the force applied to the rack bar 34 by the pinion gear 20, and the pinion gear and pinion head 18 do not commence to rotate, before the force reaction between the roller 100 and the cam 104 attributable to the applied torque achieves a magnitude exceeding the opposite thrust applied to the cam follower by the rodshaped pistons 118A, 118B. Instead, the rod-shaped pistons yield radially inward and the spool shaft commences to rotate clockwise relative to the pinion head from its relative center position against a restoring force attributable to the thrust of the rod-shaped pistons.

During such relative rotation, the roller 100 traverses the contour of the cam 104 which initiates a linear stroke of the cam follower 96 in the notch 68 toward the centerline 22. At the same time, in the direction valve 120, the valve spool 124 rotates clockwise, FIG. 5, relative to the valve body 122 so that the lands 156, 160A immediately isolate the cylinder port 168 from the return slot 150A while maintaining its connection to the pressure slot 146 and the lands 156, 160B immediately isolate the cylinder port 170 from the pressure slot 146 while maintaining its connection to the return slot 150B.

At the onset of the linear stroke of the cam follower, the pressure control spring 110 initiates linear translation of the poppet 80 against only the weak resistance of the secondary spring 92 to an open position in which both the annular orifice 94 and the aforesaid closed flow path are open. Immediately, the spring 196 in the pressure-reducing valve 143 shifts the spool 190 to its open position as fluid pressure in the end chamber 184 decreases to a magnitude insufficient to hold the spool 190 in its closed position.

With the spool 190 in its open position, the accumulator 132 commences discharging into the working chamber 42A through the big diameter end 72 of the stepped bore, the passages 164, 162 in the spool shaft, the pressure slot 146 and cylinder port 168 in the valve body, and the conduit 130A, thereby to produce in the working chamber 42A a steering assist boost pressure. At the same time, steering assist boost pressure reacts against the ball 208 in the ball chamber 200 to isolate the branch 204 from the branches 202, 206 so that steering assist boost pressure also prevails in the bore 186 behind the spool 190 where it exerts on the spool a pressure force opposite to the pressure force exerted on the spool 190 by fluid in the end chamber 184. The net effect of the pressure forces and spring force to which the spool 190 is exposed is to maintain a relatively small, e.g., 100 psi, constant, positive difference between fluid pressure in high pressure conduit 134 and steering assist boost pressure.

Steering assist boost pressure in the working chamber 42A reacts against the annular piston 40 to initiate rightward linear translation of the rack bar, FIG. 1, and power-assisted steering of the steered wheels of the motor vehicle. Linear translation of the rack bar 34 induces clockwise rotation of the pinion head 18 about the centerline 22 so that the pinion head and the spool shaft 44 rotate together about the centerline 22 but with the spool shaft rotated clockwise from its relative center position. Fluid in the working chamber 42B exhausts to the reservoir through the cylinder port 170, the return slot 150B in the valve body 122 of the direction valve 120, and the low pressure environment 140.

In the big diameter end 72 of the stepped bore 66, boost pressure exerts on the poppet 80 a net pressure force which both urges the poppet back to its closed position and seals the second frustoconical shoulder 88 against the third frustoconical shoulder 108. When such net pressure force achieves a magnitude sufficient to compress the pressure control spring 110 a distance corresponding to the size of the annular orifice 94, i.e., corresponding to the span between the first frustoconical shoulder 86 and the annular shoulder 74 of the stepped bore, such net pressure force and the secondary spring 92 shift the poppet 80 back to its closed position. At the same time, the applied torque on the steering wheel 54 maintains the angularly-displaced position of the spool shaft 44 relative to the pinion head 18 so that the pressure control spring 110 holds the second and third frustoconical shoulders 88, 108 against each other to trap fluid in the working chamber 42A at the boost pressure prevailing when the poppet attained its closed position.

If applied torque at the steering wheel 54 increases, additional relative rotation between the spool shaft 44 and the pinion head 18 occurs. The cam 104 then strokes the poppet 80 radially inward as described above to reopen the annular orifice 94 and initiate further discharge of the accumulator into the working chamber 42A and further power-assisted linear translation of the rack bar. In the new open position of the poppet 80, the cam 104 causes the annular orifice 94 to be bigger than the annular orifice first formed so that a greater boost pressure is required to return the poppet to its closed position.

Conversely, if applied torque decreases, the restoring force attributable to the rod-shaped pistons 118A, 118B and to the pressure control spring 110 rotates the spool shaft 44 counterclockwise relative to the pinion head 18 toward its center position. As the roller 100 traverses the contour of the cam back toward the center of the cam, the pressure control spring 110 expands between the cam follower 96 and the plate 106, and the corresponding force holding the second and third frustoconical shoulders 88, 108 together decreases. In that circumstance, the pressure of the fluid trapped in the fluid motor working chamber 42A reacts against the plate 106 to separate the second and third frustoconical shoulders 88, 108 and allow fluid to exhaust from the working chamber 42A to the low pressure environment 140 which, in turn, permits the suspension geometry of the motor vehicle to initiate return of the steered wheels toward their straight ahead position. When applied torque is completely released, the aforesaid restoring force returns the spool shaft to its relative center position and the suspension geometry returns the steered wheels to their straight ahead position.

Importantly, the contour of the cam 104 is calculated to achieve a nonlinear relationship between applied torque and steering assist boost pressure. Such nonlinearity obtains because, as the spool shaft 44 is rotated relative the pinion head 18 to the limit of its range of relative rotation, the cam 104 and the roller 100 cooperate to cause the rate of increase of the size of the annular orifice 94 to exceed the rate of increase of applied torque. As the size of the annular orifice increases, the net pressure force on the poppet 80 and the corresponding steering assist boost pressure required to compress the pressure control spring 110 a distance corresponding to the span of the annular orifice likewise increases. Accordingly, boost pressure increases at a rate exceeding the rate at which applied torque increases.

What is claimed is:

1. A closed center power steering gear including a pinion head connected to a steered wheel of a motor vehicle and rotatable about a centerline of said steering gear, a spool shaft connected to a steering wheel of said motor vehicle and rotatable about said centerline of said steering gear relative to said pinion head in response to an applied torque on said steering wheel, and a control valve in a fluid flow path from a fluid accumulator to a working chamber of a steering assist fluid motor operative to block said fluid flow path in a center position of said spool shaft relative to said pinion head and to open said fluid flow path when said spool shaft rotates relative to said pinion head from said center position in response to said applied torque on said steering wheel thereby to permit said accumulator to discharge into said working chamber and induce therein a boost pressure, characterized in that said control valve comprises:

a poppet supported on said spool shaft for linear translation between a closed position and a range of open positions and being biased toward said closed position by a net pressure force on said poppet attributable to fluid at said steering assist boost pressure in said fluid motor working chamber, an orifice in said fluid flow path defined between a seat on said poppet and a seat on said spool shaft, said orifice being closed and said seats on said poppet and on said spool shaft engaging each other in said closed position of said poppet and being open throughout said range of open positions of said poppet with a span between said seats on said poppet and on said spool shaft being progressively greater from a start of said range of open positions of said poppet to an end of said range of open positions of said poppet, a cam follower on said spool shaft, a cam on said pinion head operative to effect linear translation of said cam follower in response to rotation of said spool shaft relative to said pinion head from said center position, and a pressure control spring between said cam follower and said poppet operative in response to linear translation of said cam follower to induce corresponding linear translation of said poppet from said closed position to an open position in said range of opens positions of said poppet and to thereafter prevent return of said poppet to said closed position until said steering assist boost pressure in said fluid motor working chamber achieves a magnitude sufficient for said net pressure force on said poppet to compress said pressure control spring a distance equal to the corresponding span between said seats on said poppet and on said spool shaft.

2. The closed center power steering gear recited in claim 1 wherein said control valve further comprises:

means on said spool shaft and on said pinion head operative to bias said spool shaft relative to said pinion head to said center position of said spool shaft.

3. The closed center power steering gear recited in claim 2 wherein:

said seat on said poppet is a frustoconical shoulder on said poppet, and said seat on said spool shaft is a circular edge of an annular shoulder around said poppet.

4. The closed center power steering gear recited in claim 1 wherein said control valve further comprises:

a passage through said poppet having a first end communicating with fluid at said steering assist boost pressure and a second end communicating with a low pressure environment in said steering gear, and a seal plate disposed between said pressure control spring and said second end of said poppet having a seat thereon engageable on a second seat on said poppet to close said passage through said poppet when said force of said pressure control spring on said seal plate exceeds a net pressure force on said seal plate attributable to boost pressure in said fluid motor working chamber and to open said passage through said poppet by separating said second seat on said poppet from said seat on said seal plate when said net pressure force on said seal plate attributable to boost pressure in said fluid motor working chamber exceeds said force on said poppet of said pressure control spring.

5. The closed center power steering gear recited in claim 4 further comprising:

a pressure-reducing valve means in said fluid flow path from said fluid accumulator to said working chamber of said steering assist fluid motor operative to maintain a positive and substantially constant difference between a fluid pressure in a portion of said fluid flow path between said pressure-reducing valve means and said control valve and said steering assist boost pressure in said working chamber of said steering assist fluid motor.

* * * * *